United States Patent [19]
Huignard et al.

[11] 4,368,386
[45] Jan. 11, 1983

[54] LIQUID-CRYSTAL IMAGE CONVERTER DEVICE

[75] Inventors: Jean-Pierre Huignard; Serge Le Berre; Christian Mayeux; Francois Micheron, all of Paris, France

[73] Assignee: Thomson-CSF, Paris, France

[21] Appl. No.: 231,117

[22] Filed: Feb. 3, 1981

Related U.S. Application Data

[63] Continuation of Ser. No. 943,818, Sep. 19, 1978, abandoned.

[30] Foreign Application Priority Data

Sep. 23, 1977 [FR] France .................. 77 28738

[51] Int. Cl.³ .............................. G02F 1/135
[52] U.S. Cl. .................... 250/213 R; 350/342
[58] Field of Search ............ 350/342, 337, 347; 250/213 R, 213 VT; 430/20; 252/501.1, 299.01

[56] References Cited

U.S. PATENT DOCUMENTS

| | | |
|---|---|---|
| 3,592,527 | 7/1971 | Conners et al. .............. 350/342 |
| 3,607,388 | 9/1971 | Hori et al. ................ 252/501.1 X |
| 3,803,408 | 4/1974 | Assouline et al. ............ 350/342 X |
| 4,015,984 | 4/1977 | Ohta et al. ................ 252/501.1 X |
| 4,068,926 | 1/1978 | Nakamura et al. .............. 350/337 |
| 4,206,979 | 6/1980 | Jost ........................... 350/342 |

Primary Examiner—David C. Nelms
Assistant Examiner—Edward P. Westin
Attorney, Agent, or Firm—Cushman, Darby & Cushman

[57] ABSTRACT

The invention provides an image converter device which utilizes a liquid crystal cell in which a layer of a nematic material or a nematic-cholesteric mixture is enclosed between a first plate of a photoconductive material, provided with an external electrode, and a second transparent plate, provided with an internal electrode. The photoconductive material may be bismuth oxide, or a mixture of the latter with germanium or silicon oxide. A direct or alternative voltage is applied between the electrodes. An X-rays image, or an image displayed on the screen of a C.R. tube is projected onto the photoconductive plate whose conductivity, thus spatially modulated, causes a spatially variable voltage to be applied in the liquid crystal layer. Various electro-optical effects, such as dynamic scattering, controlled birofringence or controlled rotatory polarization in a twisted structure, can be used to make the projected image to appear in the liquid crystal layer illuminated by a visible light read-out beam and be directly observed or enlarged by projection onto a screen.

25 Claims, 3 Drawing Figures

LIQUID-CRYSTAL IMAGE CONVERTER DEVICE

This is a continuation of application Ser. No. 943,818 filed Sept. 19, 1978, now abandoned.

FIELD OF THE INVENTION

The present invention relates to image converter devices in which a photoconductive material is associated to a liquid crystal layer. It more particularly concerns X-rays generated images into visible images converters for radioscopy or radiography, projection on to large screens of T.V. images and telereprography.

BACKGROUND OF THE INVENTION

In the prior art, it is known that layers of nematic liquid crystals or of nematic-cholesteric liquid crystal mixtures exhibit electro-optical effects which can be rapidly controlled by subjecting the layer to variations in electrical voltage not exceeding a few tens of volts.

All these effects are based on the common property of mesomorphous materials, when in contact with a solid wall, of orientating the long molecules of which they consist in a common direction, either parallel or perpendicular (the orientation is then called "homeotropic") to the plane of the wall. The direction of this parallel or homeotropic orientation depends on the respective natures of the liquid crystal material and the wall material; it is furthermore greatly facilitated by introducing traces of appropriate surfactants into the mesomorphous material as well as by preliminary treatment of the walls in contact with the film (by rubbing scratching or evaporation at a grazing incidence of a film of silicon oxide, enabling for example the liquid crystal to be orientated parallel to a particular direction of the wall, which is the direction of rubbing or scratching or the projection of the direction of incidence). These layers in uniform orientation are perfectly transparent to visible light. Nematic films are furthermore very highly double-refractive uniaxial media, the optical axis being parallel to the direction of alignment.

The mesomorphous materials elongated molecules exhibit pronounced dielectric anisotropies, and under the action of an electric field, are thus submitted to a torque which tend to arrange them either in parallel or perpendicular orientation to the field according to whether this anisotropy is positive or negative. Consequently, if a layer of a nematic material is enclosed between two transparent electrodes subjected to a variable direct or alternating voltage, it will be found, if the material exhibits a positive dielectric anisotropy and is disposed in parallel orientation, that above a threshold voltage (of the order of 1 to 5 for a layer about ten microns thick) the birefringence of the layer measured perpendicularly to its plane decreases when the applied voltage is increased: the molecules tend to become orientated parallel to the field, and so the optical axis, initially perpendicular to the direction in which the light is propagated, tilts progressively towards a parallel direction. The phenomena are opposite with a homeotropically orientated negative-anisotropy material: the optical axis, initially perpendicular to the layer and parallel to the direction of propagation, tilts towards the plane of the layer, and so the birefringence progressively appears. This effect, called "controlled birefringence", enables the brightness of monochromatic light, or the colour of polychromatic light, transmitted by a nematic layer to be spatially modulated, by imparting local variations to the voltage applied to the layer and arranging the latter between parallel or crossed polarizers.

It is also possible to take advantage of the dielectric and optical anisotropic properties of nematic materials in order to control electrically the light transmitted by a thin layer using the structures called "twisted nematic". A thin layer of positive dielectric anisotropy is inserted in parallel orientation between two transparent electrodes superficially treated, as previously indicated, to orient the molecules of the layer in contact with one wall and the other in two perpendicular directions; the molecules of the intermediate planes in the layer, while remaining parallel to the plane of the walls, rotate progressively about an axis perpendicular to the layer so as to avoid any discontinuity in orientation from one wall to the other. The result of this is a twisted structure which, because of the high optical anisotropy of the material, possesses the advantageous property of imparting rotation through 90° to linearly polarized light being propagated perpendicularly to the strip. If the layer is subjected to a voltage greater than a threshold voltage, the molecules tend to straighten up and to adopt a homeotropic structure, which causes any anisotropy to disappear. When disposed between crossed (or parallel) polarizers, such a layer will totally transmit (or stop) the incident light at the points where it is subjected to a voltage of less than the threshold voltage; at the points where the applied voltage is greater than the threshold voltage the incident light is transmitted to a lesser (or greater) extend as an increase in this voltage causes the structure of the layer to approach more closely to the homeotropic structure.

If a continued increase is maintained in the voltage to which a thin layer in the nematic phase is subjected, a second optical phenomenon which very quickly masks the phenomenon of double refraction appears above a second threshold voltage (of the order of 5 to 7 volts for a layer about ten microns thick): the layer, initially perfectly transparent, acquires a more and more diffusing nature when the applied voltage increases. This effect, which is called "dynamic scattering", and is also applicable to images display is due to the movement under the field action, of electrically charged particles which disorganizes the initially uniformly oriented layer into randomly oriented, and consequently light scattering, clusters. Just like controlled birefringence, dynamic scattering is perfectly reversible. However, adding a small amount of cholesteric material to the nematic material results in a mixture wherein the scattering structure persists for several hours when the control voltage is restored to a value smaller than the dynamic scattering threshold voltage, and consequently having optical storage properties. The application of an alternating voltage at a frequency higher than that of the control voltage enables the mixture to be restored to its initial transparent state.

In order to obtain local variations in the voltage to which the thin layer of liquid crystal is subjected, M. FRAPPIER, G. ASSOULINE, M. HARENG and E. LEIBA proposed, in an article entitled "Liquid-crystal photoconductive image-converter" published in the Nouvelle Revue d'Optique Appliquée (1971, 2, No. 4, pp 221-228) an invention protected by U.S. Pat. No. 3,803,408 issued to G. ASSOULINE, E. LEIBA and E. SPITZ on Apr. 8, 1974., that a thin layer (a few micrometers in thickness) of a photoconductive material, whereof the detection threshold is chosen for example in the near U.V. region, be disposed between one of the transparent electrodes and the nematic material. An image in ultra-violet light, which may be of low intensity, is projected on to the photoconductive layer, whereof it spatially modulates the resistivity. At the unlit points, the nematic layer is subjected to only a fraction of the voltage applied to the electrodes, and remains transparent if matters are so arranged that this fraction of the voltage is at most equal to the diffusion threshold; on the contrary, at the illuminated points the resistance of the photoconductor decreases, the voltage applied to the liquid crystal increases, and the layer acquires a scattering structure. The whole is illuminated with white light which, even if of very high intensity, passes through the photoconductive film without modifying its resistivity if its ultra-violet component has been suitably filtered out. This results in an image-converter which can be used to project T.V. pictures onto a large screen.

In an U.S. Pat. No. 3,798,452 that issued to E. SPITZ, E. LEIBA and G. ASSOULINE on Mar. 19, 1974, it was proposed that the layer of nematic material be replaced by a storage layer consisting of a nematic-cholesteric mixture. It does not then matter what the spectral detection threshold of the photoconductor is, the image being written in with the voltage applied by a low-intensity light-beam, and being projected by a high-intensity beam after the voltage applied to the electrodes has been switched off.

In an U.S. Pat. No. 3,829,684, that issued to G. ASSOULINE, M. HARENG and E. LIEBA on Aug. 13, 1974, it has been furthermore proposed that a fluorescent material layer be deposited on a transparent electrode covering a photoconductive film co-operating with a thin layer of a nematic material or of a nematic-cholesteric mixture, in order to embody a device for visible display of images projected by means of ionizing radiation, the device being more particularly applicable to radioscopy. The light-radiation emitted by the fluorescent screen under the impact of X-radiations for example, by locally modifying the electrical resistance of the photoconductor, spatially modulates the voltage to which the layer of liquid crystal is subjected, which layer thus acquires a more or less scattering nature. This device provides images which are better contrasted, thanks to the dynamic scattering threshold effect, and brighter than those provided by conventional fluorescent screens; furthermore, the use of a liquid crystal mixture having storage properties protects the observer from any radiation, since examination of the image may then be carried out after the ionizing radiation has been switched off.

In these devices, the nature of the photoconductor materials (zinc oxide, cadmium sulphide, selenium) and the fact that they must be used in the form of a thin layer a few micrometers in thickness, involve critical problems in embodiment, due more particularly to the too low transverse electrical resistance of these layers in the absence of illumination. Furthermore, in uses in conjunction with radioscopy, the thickness of the photoconductive layer being too small to absorb the X-radiation sufficiently, the latter must be first of all converted into ultra-violet or visible radiation by way of a fluorescent screen.

SUMMARY OF THE INVENTION

It is an object of the present invention to improve the performance and simplify the embodiment of these images converter devices of the prior art by replacing the thin photoconductive layer with a thick plate of an appropriate photoconductive material, which may be either bismuth oxide or a mixture of bismuth oxide and silicon or germanium oxide pure or doped. These materials exhibit very high resistivity in the absence of illumination, and remarkably great photoconductivity, essentially linked to the exceptionally long lifetime of the photo-electrons. The thickness of these plates and the presence of bismuth, with a high atomic number result in a high absorption of ionizing radiation, X-rays for example, and dispense with the use of an intermediate fluorescent screen. The introduction in these materials of appropriate impurities which considerably reduces their visible light induced photoconductivity then enables read-out to be operated by means of white light and simultaneously with writing in. The light absorption coefficient of these materials being comparatively poor, since varying, according to the wavelength, between 2 and 25 $cm^{-1}$, the material photoconductivity thus extends to an appreciable depth from the irradiated surface, and consequently makes it possible to use a photoconductive plate sufficiently thick to replace the transparent plate which, in the devices of the prior art, serves to support the liquid crystal layer; this simplifies the embodiment of the device and improves its sensitivity. Finally, the use of a solid photoconductive material eliminates the problems of reproducibility inevitably encountered with thin layers, whether they are obtained by thermal evaporation or cathodic pulverization.

It is an other object of the present invention in order to transform the spatial variations in conductivity which appear in a variously illuminated photoconductor into spatial variations of the optical properties of an adjacent liquid crystal layer, to employ not only the dynamic scattering effect in layers of nematic material or nematic-cholesteric mixtures, but also the controlled birefringence effect in nematic layers with homeotropic or parallel structure, or the variations in rotary polarization in twisted nematic structures.

BRIEF DESCRIPTION OF THE DRAWING

Other features and advantages of the invention can be better understood from the following detailed description, when read in conjunction with the drawing in which.

DETAILED DESCRIPTION

Figure 1:
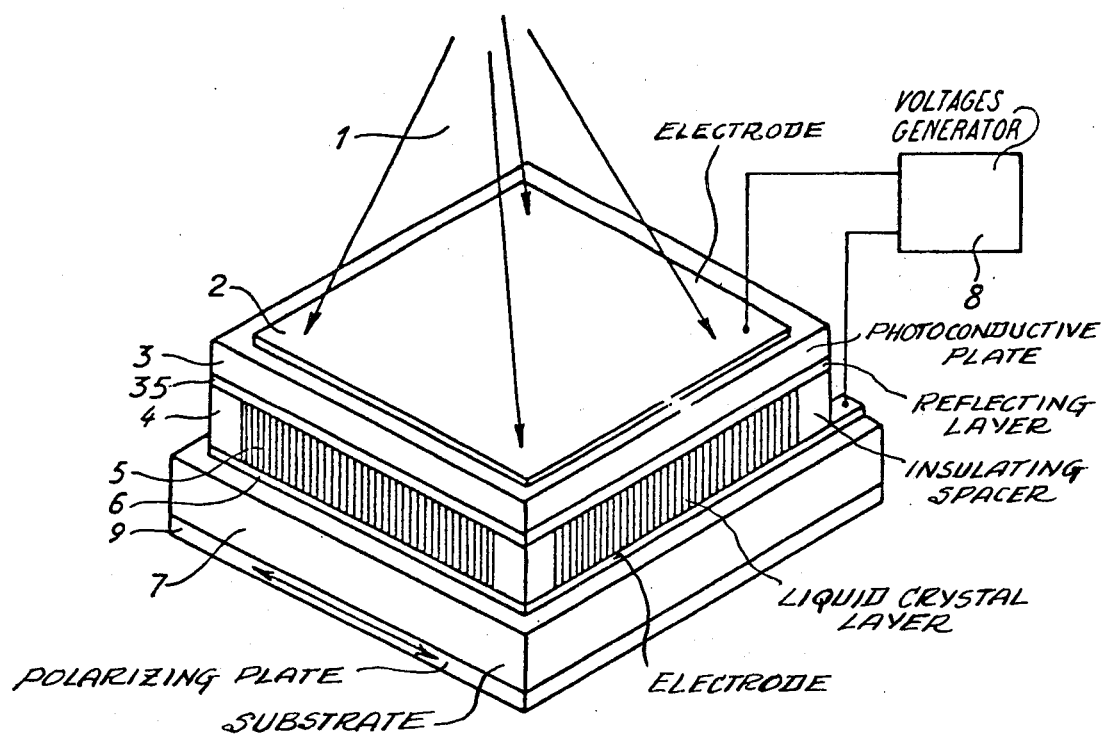
FIG. 1, is a schematic showing of a cell according to this invention and comprising a liquid crystal layer enclosed between two plates, one of these plates being made of a photoconductive material.

FIG. 1 illustrates an images converting cell receiving an image projected by a writing-in beam 1. Following the incident direction of the beam 1, successive encounters are made with an electrode 2, a photoconductive plate 3, a layer 35 which reflects the read-out radiation and a layer of liquid crystal 5. The photoconductive plate is joined by insulating spacers 4 to a substrate 7 on the inner surface of which a second electrode 6 is deposited. The liquid crystal layer is introduced into the space provided by the spacers between the reflecting layer 35 and the electrode 6. A linearly polarized light analyzer plate 9 is secured to the outer surface of substrate 7. The electrodes 2 and 6 are connected to an electrical-voltage generator 8. Electrode 2 and the assembly consisting of electrode 6 and the substrate 7 must be respectively transparent to the radiation constituting the writing-in beam 1 and that used for reading out the written-in image. Electrodes 2 and 6 may consist of a deposit a few tenths of a micrometer thick of tin oxide or indium oxide, or a mixture of these oxides, deposited by cathodic pulverization. If the writing-in radiation is X-radiation, a layer about a thousand ångströms thick of a metal having a low atomic number will preferably be used for the electrode 2.

Layer 35 may exhibit specular or scattering reflection. Its lateral conductivity may be low, without for that reason preventing current from passing between the photoconductive plate 3 and the liquid crystal layer 5. Various compositions of multi-electrical layers having a high coefficient of reflection comply with these requirements: it is also possible to use a mosaic of reflective metal elements laterally insulated from one another and disposed on an opaque layer. The pressure of this layer 35 used only when the radiation enabling the written-in image to be read out enters the cell from the side of the substrate 7 (read-out by reflection).

The liquid crystal layer 5, the thickness of which, about 10 to 20 micrometers, is imposed by the spacing between layer 35 and electrode 6, is made of a mesomorphic material having nematic properties at ambient temperature. By way of example, methoxy-bensilidene-butyl-aniline (or MBBA), ethoxy-benzilidene-butyl-aniline (or EBBA) or a mixture of these two substances may be used if negative dielectric anisotropy is desired, or 4-pentyl-4'-cyano-biphenyl (PCB) in the opposite case. In order to function with controlled rotatory polarization in twisted structures, these materials will be sufficiently purified for their resistivity to attain $5 \cdot 10^8$ ohm·m. If the liquid crystal layer is intended to function in the dynamic scattering mode, these materials will be supplemented by traces of a doping material such as tetra-methyl-ammonium bromide or tetra-butyl-ammonium bromide, so as to reduce their electrical resistivity to about $10^7$ ohm·m. When a liquid crystal layer having a memory is desired, a nematic-cholesteric mixture will be used, for example a mixture of 85% MBBA or EBBA an 15% cholesteril erucate. The relative dielectric constant of these materials is of the order of 10.

The photoconductive material constituting plate 3 is either bismuth oxide $Bi_2O_3$, or a mixed oxide of bismuth and silicon (B.S.O.) or germanium (B.G.O.). It occurs in the form of the monocrystals, obtained by drawing from molten baths, or of polycrystals, obtained by sintering under pressure, the starting material being bismuth oxide or a mixture of oxides substantially close to one molecule of $SiO_2$ or $GeO_2$ to six molecules of $Bi_2O_3$. The sintered materials enable plates of larger dimensions to be obtained than do the monocrystalline materials; although their transparency to visible light is much poorer, they possess dielectric and photoconductive properties very similar to those of the monocrystalline form. The energy threshold for absorption of the intrinsic type, of the order of 3 eV, is situated in the near ultra-violet region, but there is also an absorption of the extrinsic type which would be due to silicon vacancies in the crystalline network, and would have a threshold of the order of 2.2. eV. This extrinsic absorption may be eliminated by doping the crystals with $Al^{3+}$ ions. The light absorption coefficient is of the order of 2 cm$^{-1}$ at 5,140 Å and 20 cm$^{-1}$ at 4,420 Å for the undoped mixed oxide of bismuth and silicon; it reaches 25 cm$^{-1}$ for X-radiation of 80 keV, whatever the nature of the material. The electrical resistivity in the absence of illumination is very high: $10^{11}$ to $10^{12}$ ohm·m. The conductivity is a linear function of irradiance and is of the order of $5 \cdot 10^{-9}$ to $5 \cdot 10^{-10}$ ohm$^{-1}$ cm$^{-1}$. By way of example, measurements carried out in the Applicants' laboratories have shown that resistivity of a plate 1 mm thick of mixed bismuth and silicon oxide, measured in the direction of propagation of the exciting light, varied between $3 \cdot 10^{11}$ ohm·m. in the absence of radiation and $2 \cdot 10^8$ ohm·m. for an irradiance of 1 mwatt/m$^2$ at 5,140 Å. The relative dielectric constant is equal to 56 for mixed bismuth and silicon oxide, and to 40 for mixed bismuth and germanium oxide.

When a voltage U is applied to the terminals of electrodes 2 and 6 sandwiching the couple photoconductive plate 3—liquid crystal layer 5, the latter functions as a resistive voltage-divider as long as the frequency of this voltage remains sufficiently low for the resistances of the layers to stay substantially lower than the resultant impedances of the associated capacities. If the respective resistances of a surface elements of the photoconductive strip 3 and of the liquid crystal layer 5 are designated by $R_{P.C.}$ and $R_{L.C.}$, the voltage V to which the liquid crystal element is subjected is:

$$V = \frac{R_{L.C.}}{R_{P.C.} + R_{L.C.}} U$$

Since in the absence of illumination, the resistivity of the photoconductor is largely greater than that of the liquid crystal the latter is not subjected to any voltage at the points where the writing-in beam 1 exhibits zero current. On the contrary $R_{P.C.}$ decreases at the points illuminated by the beam 1, the liquid crystal is subjected to a non-zero value of V, and as soon as this latter exceeds the threshold voltage of the effect being used, has its optical properties modified.

By way of example, the cell of FIG. 1 may consist of a plate of undoped BSO 0.5 mm thick and a layer of P.C.B. 10 $\mu$m thick arranged in a twisted structure. The resistance of a 1 cm$^2$ surface element of liquid crystal is $R_{L.C.} = 5 \cdot 10^7$ ohms; using writing-in radiation at 5.140 Å, measurements carried out in the Applicants' laboratories showed that the resistance of a photoconductive element of equal surface area was given substantially by:

$$R_{P.C.} = 10^6/I$$

where R is expressed in ohms and I is the writing-in light-power expressed in watts received by this 1 cm$^2$ surface element; this relationship is valid only if I is greater than 10 $\mu$·watts·cm$^{-2}$, which enables the dark current of the photoconductor to be neglected. A simple calculation shows that under these conditions the voltage applied to the liquid crystal is:

$$V = 50 \, I \cdot U$$

Thus if the cell is subjected to a d.c. voltage of U=100 V, the threshold voltage of 1.5 V will be attained at an irradiance of 0.3 mwatt·cm$^{-2}$, and the homeotropic structure, corresponding to a voltage of about 3 V, at an irradiance of 0.6 mwatt·cm$^{-2}$.

It is also possible to use the controlled birefringence mode in a layer in initially homeotropic orientation by substituting a layer of equal thickness of an equimolecular mixture of MBBA and EBBA for the layer of PCB. The layer still being subjected to a voltage of 100 V, birefringence will appear at a voltage of U=4.7 V, that is to say an irradiance of writing-in radiation of the order of 1 mwatt·cm$^{-2}$. By increasing this intensity by 50%, a phase-shift of $\pi$ is obtained between the luminous vibrations of a read-out beam at 7500 Å (red) propagating along the slow and rapid axes of the liquid crystal. An identical phase-shift is obtained by an increase of the luminous intensity of 20% if the wavelength is reduced to 5.800 Å (yellow).

If it is desired to use the liquid crystal in the dynamic scattering mode the foregoing mixture (MBBA-EBBA), or a mixture of MBBA and cholesteryl eructate is doped with traces of impurities in order to reduce its electrical resistivity. The resistance of a 1 cm$^2$ surface element then falls to $R_{C.L.} = 10^6$ ohms, and the voltage applied to the liquid crystal becomes:

$$V = I \cdot U$$

The scattering threshold of the order of 7 V, is reached at 70 mwatt·cm$^{-2}$ for a voltage U of 100 V applied to the cell. As in the foregoing cases, the sensitivity of the cell to the writing-in radiation may be increased by raising the value of U, which is limited only by the breakdown voltage. Thus if U is taken to 1,000 V, the intensity of illumination needed to reach the threshold is reduced to 7 mwatt·cm$^{-2}$.

The writing-in beam 1 projects the image as a whole onto the cell, as is the case for example for a conical beam of X-rays passing through a substance of variable transparency interposed between the X-ray source and the cell, or writes it point by point, by an appropriate scanning.

The image thus written into the cell may be examined directly, or projected onto a receiving surface by an optical system. In one case as in the other, the so-called read-out radiation, which is intended to make an impression on the eye of the observer, may pass right through the cell, the reflective layer 35 then being omitted (so-called transmission read-out) or may carry out two successive passages into the liquid crystal layer, one of them after reflection on the layer 35 (so-called reflection read-out). In the case of direct examination (without projecting system) and more particularly when the liquid crystal is working in the dynamic scattering mode, ambient light may be used as read-out radiation.

In the case of examination by transmission, the read-out light is polarized either parallel or perpendicular to the direction of polarization of the analyzer 9. If the liquid crystal is used in dynamic scattering mode, natural light may be used as illuminating light, and analyzer 9 may be omitted; if the liquid crystal is being used with controlled birefringence and exhibits an initially homeotropic orientation, the linear analyzer 9 is advantageously replaced by a circular analyzer; the illuminating light is then circularly polarised light, as described in copending U.S. application Ser. No. 48,773, filed on June 15, 1979, now abandoned, which is a continuation of U.S. application Ser. No. 349,939 filed on Apr. 11, 1973, now abandoned, by G. ASSOULINE, M. HARENG and E. LEIBA.

In all cases, the read-out light passing through the photoconductive plate 3 must be chosen to be in a range of wavelengths not absorbed by the photoconductor. It is however possible, by using a read-out source in the form of a source of white liquid equipped with a filter which eliminates the shortest wavelengths, to calculate said fiber so that it transmits, in the spectral range in which the photoconductor is sensitive, sufficient intensity for the transverse resistance of the plate to assume a value such that the voltage applied to the liquid crystal layer 5 is equal to the threshold voltage of the effect being used for zero intensity of the writing-in beam 1. This eliminates the threshold effect which is characteristic of liquid crystals, and which can be detrimental in certains applications.

When the cell is examined by reflection, the read-out radiation does not enter the photoconductive plate 3, and may be chosen independently of the optical properties of this latter. The liquid crystal can work with controlled birefringence by using natural light as the read-out light. This method of reading-out is recommended if the photoconductive plate 3 is made of a sintered material only slightly transparent to visible light.

Figure 2:
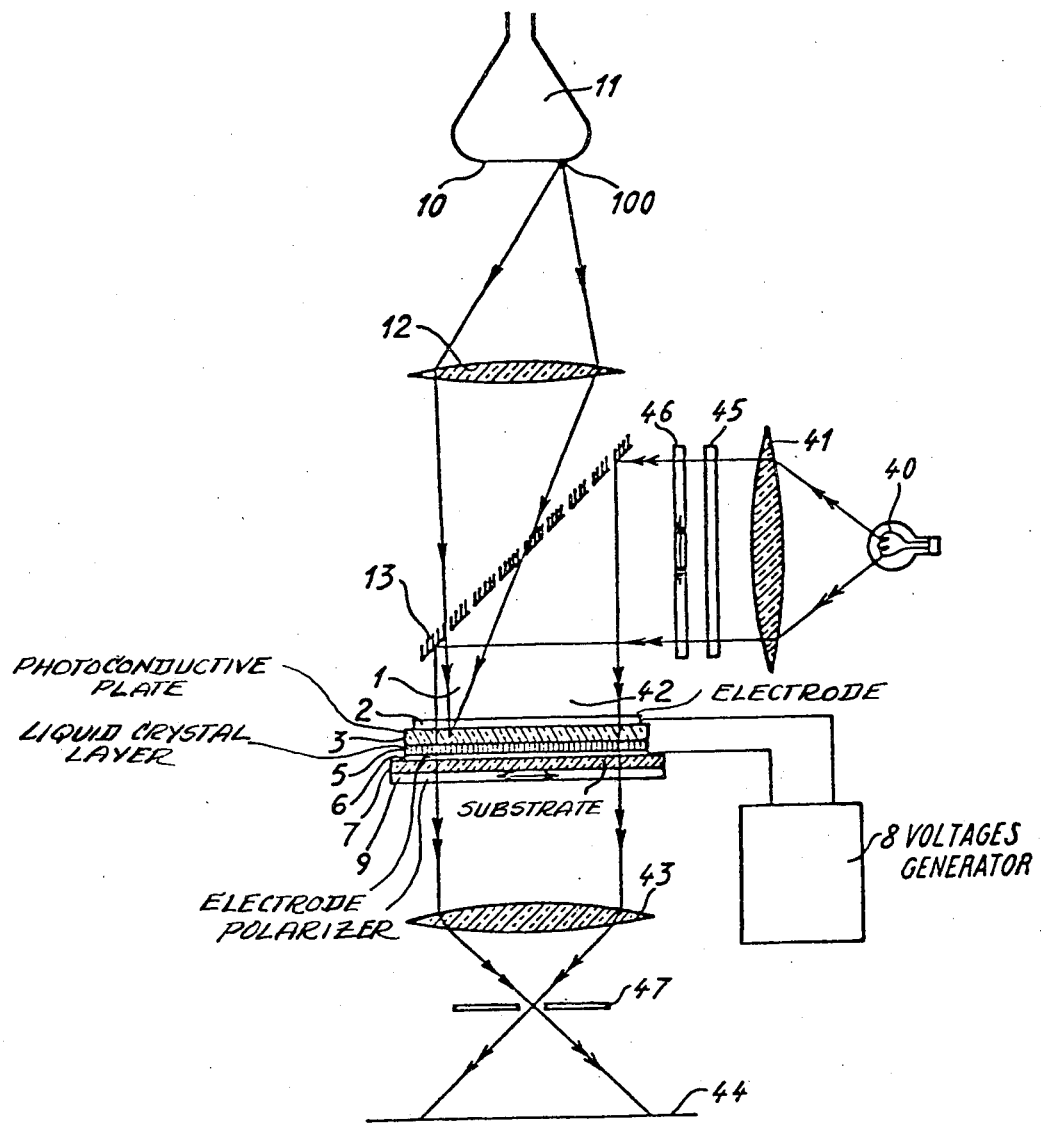
FIG. 2, is a schematic showing of an optical device according to the invention and using the cell of FIG. 1 for projecting television pictures on large screens or telecopying of documents.
Figure 3:
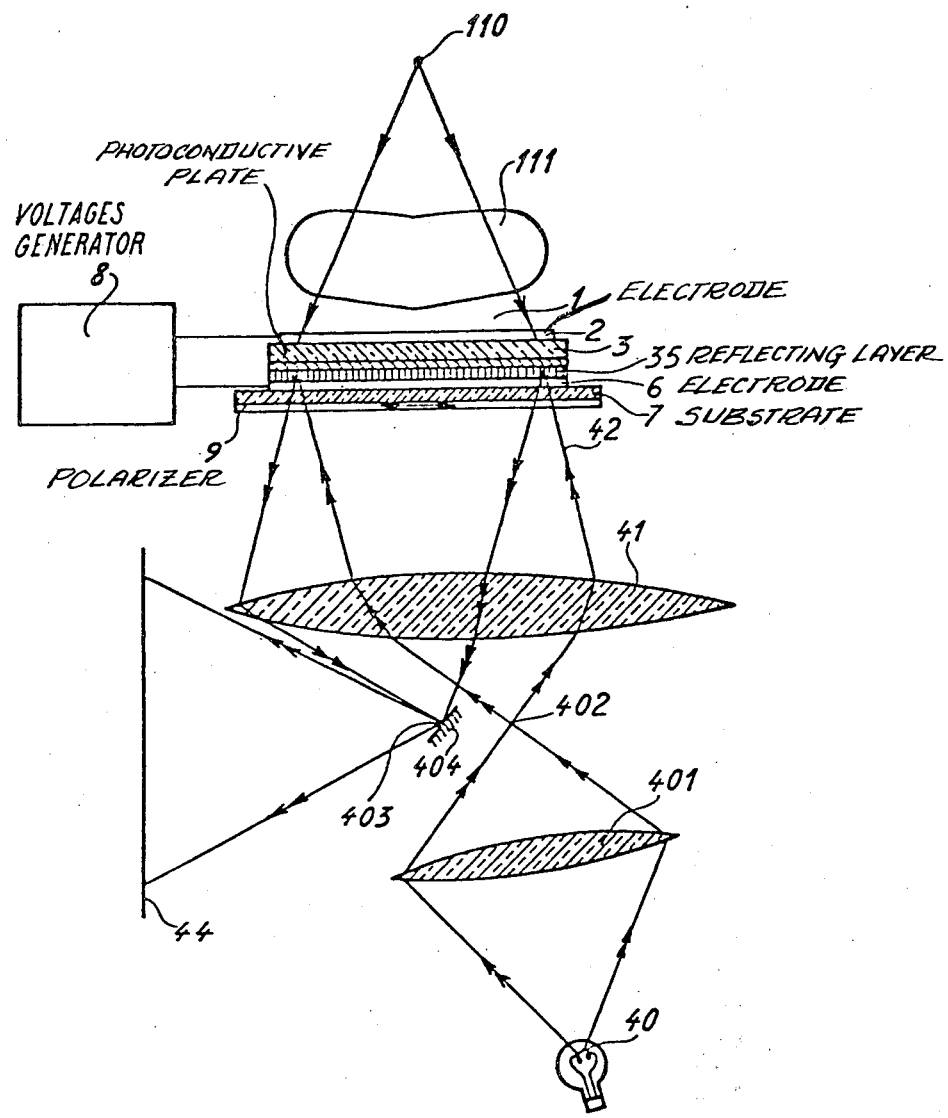
FIG. 3, is a schematic showing of another optical device according to the invention and using the cell of FIG. 1 for displaying an image projected by X-rays.

FIGS. 2 and 3 show optical devices with transmission or reflection read-out, designed to project images written as above described in connection with FIG. 1 into a liquid crystal layer onto a screen, a photosensitive layer or the target of a remote-transmission device.

The electro-optical device of FIG. 2 is intended for projecting television pictures on to a large screen. The same references 2 to 9 as those used in FIG. 1 designate the constituent elements of the liquid crystal cell and its power supply.

The transmitted pictures are formed on the screen 10 of a cathode-ray tube 11 of the "flying spot" type emitting in the blue-violet region. An objective 12 projects the image of the screen 10 on the photoconductive plate 2 via a dichroic or semi-transparent mirror 13 and provides from a spot 100 the convergent writing-in beam 1 which writes the pictures into the cell.

A light-source 40 disposed at the focus of a collimator 41 provides a parallel read-out beam 42 which, after reflection by a mirror 13, passes through the cell at normal incidence. A second objective 43 projects the image of the liquid crystal layer 5 on a screen 44. The spectral distribution of the read-out beam 42 is calculated so that in the absence of any writing-in beam 10 the voltage V applied to the liquid crystal layer 5 does not exceed the threshold voltage of the effect being used in the liquid crystal; this result is obtained either by suitable choice of the source 40, either by interposing a filter 45 in the path of the read-out beam, or by suitably proportioning the spectral reflectivity of the mirror 13 when the latter is a dichroic mirror.

The photoconductive material is chosen to exhibit good transparency in at a least a part of the spectrum corresponding to visible light. For this reason, a monocrystalline material is preferably used, taking into account the fact that the cell may be of small dimensions (about 3×4 cm$^2$), which material may be doped in order to avoid any absorption in the blue-green part of the spectrum.

The cell may make use of any of the three electro-optical effects hereinbefore mentioned.

When a twisted nematic cell is used, the walls enclosing the liquid crystal layer are so treated that the latter assumes the twisted structure in the absence of any applied voltage; the direction of polarization of analyzer 9 is chosen to be parallel to one or other of the orientations imparted to the liquid crystal in contact with the walls. If the liqud emitted by source 40 is not linearly polarized, a linear polarizer 46 is disposed in the path of read-out beam 42. The direction of polarization of this beam is chosen to be parallel to the direction of polarization of analyzer 9 if it is desired that the pictures displayed on the screen 10 be projected in the form of positive images (points of light on the screen 10 projected in the form of points of light on the screen 44), and perpendicular in the opposite case.

If controlled birefringence is adopted, the nematic liquid crystal cell may be illuminated with linearly polarized light, as above described in the case of a twisted nematic cell the polarization direction being arranged at 45° to the plane perpendicular to the layer in which the optical axis of the liquid crystal moves. When the initial orientation of the liquid crystal is homeotropic, the orientation of this plane may be determined for example by slightly scraping one of the walls, as described in the above mentioned copending application Ser. No. 48,773.

Analyzer 9 is arranged in crossed or parallel orientation with that of the illuminated light. The intensity of light $I_T$ then transmitted by the cell as a function of the incident intensity $I_O$ of beam 42 and of the phase-shift $\Delta\phi$ produced by the layer, is given by the relationships:

$I_T = I_O \sin^2 \Delta\phi/2$ between crossed polarizers $I_T = I_O \cos^2 \Delta\phi/2$ between parallel polarizers.

the phase-shift $\Delta\phi$ being:

$$\Delta\phi = 2\pi \frac{e \cdot \Delta n}{\lambda}$$

where e is the thickness of the cell, $\lambda$ the read-out light wavelength and $\Delta n$ the difference between optical indices along the two neutral axes of the birefringence layer, which difference is a function of the applied electrical field.

As previous by mentioned, the nematic layer, if in homeotropic initial orientation, may also be illuminated with circularly polarized light; a circular analyzer is then substituted for the linear analyzer 9.

If the read-out light is substantially monochromatic, the phase-shift $\Delta\phi$ produced at the wavelength being used by the variations in the intensity of the writing-in beam 1 is preferably made to vary from $K\pi$ to $(K+1)\pi$, K being a whole number, so that the transmitted intensity of the read-out beam 42 is a monotone function of the intensity of the writing-in beam. This enables the voltage V to be chosen, for null intensity of the writing-in beam, greater than the threshold voltage of controlled birefringence and therefore the read-out beam to be used in a region of the spectrum in which the photoconductive material still exhibits a certain amount of photoconductivity. Positive or negative transcription of the pictures displayed on the screen 10 of the cathode-ray tube is obtained by chosing the interval for the variations in $\Delta\phi$ and arranging polarizer 9 in parallel or crossed orientation to the direction of polarization of read-out beam 42. By way of example, if consideration is given to the previously mentioned case in which variations in the intensity of the illuminating beam produce a variation in phase-shift $\Delta\phi$ from 0 to $\pi$ for a read-out light at 5,800 Å, such a cell will not transmit the read-out light to the points not illuminated by the writing-in beam, will start transmitting this light when the irradiance of the writing-in beam is of the order of one milliwatt/cm$^2$, and will become totally transparent at an irradiance of 1.20 milliwatt/cm$^2$; a positive transcription of the picture is therefore obtained.

The picture written into the cell by controlled birefringence may also be read-out in white light; the variations in intensity of the writing-in beam will then be transcribed into chromatic variations in the projected picture. Turning back to the foregoing example of a layer between crossed polarizers but now illuminated in white light, and wherein the maximum intensity of the writing beam produces a phase-shift of $\pi$ for red light, the zones situated below the writing-in threshold appear black, and the picture turns form blue to red when the intensity of the writing-in beam increases. Advantage may be taken of such a device for coloured projection of thermographic pictures, the coldest zones appearing in blue, and the hottest in red.

When dynamic scattering mode is chosen, read-out beam 42 may be a rectilinearly polarized beam of white light. Use is made of the depolarizing effect on the light due to the more or less scattering state of the liquid crystal. The polarizers are crossed or parallel according to whether the projected images must be the positive or the negative of the displayed T.V. pictures. It is also be possible to use a read-out beam 42 of natural white light. Analyzer 9 is then omitted, and a diaphragm 47 is introduced into the focal image plane of the objective 43; this diaphragm is provided with a circular orifice 470 centred on the optical axis, and acts as a spatial filter.

Beam 42 being a parallel-light beam, the only rays which then participate in forming the image on screen 44 are those which, not being scattered by the liquid crystal, cross one another in the region of the image focus.

The projected images are thus the negative of the displayed T.V. pictures. By reversing the spatial filter, that is to say replacing the circular-orifice diaphragm by a disc obscuring the image focus, it is possible to reconstitute the displayed T.V. picture in positive form; this second device nevertheless requires objective 43 to be provided with a larger numerical aperture.

The pictures displayed on screen 10 may be pictures transmitted according to normal television standards. The brightness of a commercial tube of the "flying spot" type is in fact sufficient to excite the cell up to relatively high light frequencies, of the order of 20,000 lines/s. The spatial resolution of the cell is much greater than might be deduced from the thickness of the photoconductive strip; up to 900 traces may be recorded by using a B.S.O. crystal with a thickness of 0.8 mm. It may be further improved by reducing the thickness of the crystal to about 0.1 mm.

The device of FIG. 2 is adaptable to the telecopying of documents. The image of the document to be copied is displayed on screen 10, and recorded on a photosensitive layer replacing the screen 44. By using a nematic-cholesteric mixture for constituting the liquid crystal layer 5, transmitted images can be recorder for a time of several hours, which is large enough to enable numerous copies to be made of a same document.

The device of FIG. 2 is also adaptable to display of images projected by ionizing radiation, X-rays for example: The moving light-source in the form of the spot 100 of the cathode-ray tube 11 is then replaced by a fixed source of radiation which may be the focus of an X-ray tube. The objective 12 is omitted, and the substance to be examined is interposed between the focus and the mirror 13. This latter must then be transparent to the radiation being considered. In case of X-rays, a thin plate of polymerized organic material (methyl polymethacrylate for example) is used, covered with a fine layer of aluminium.

The embodiment of FIG. 3 concerns an optical device more especially adapted to display of X-rays projected images. This device is provided with a cell having the same elements designated under the same references as FIG. 1. A technical reflection is used for read-out. A large dimensions cell ($40 \times 40$ cm$^2$) may be obtained by using a photoconductive plate made of a sintered material. The liquid crystal layer 5 is preferentially made of a nematic-cholesteric mixture having storage properties.

An X-rays source 110 emitting a beam which, after having passed through an object 111 to be examined, constitutes the writing-in beam is arranged on the side of the cell comprising the photoconductive plate 3.

On the opposite side of the cell there is a point-type source 40 of white light. An objective 401 concentrates the radiation emitted by source 40 at a point 402 disposed in the focal plane of a collimator 41 parallel to the plane of the cell. The optical axis of the objective 401, on which source 40 is disposed, is at a small angle to the optical axis of collimator 41; the cell is thus illuminated by a parallel read-out beam 42 at quasi-normal incidence.

In the absence of scattering by the liquid crystal layer 5 mirror 35 reflects read-out beam 42 to collimator 41, which concentrates it at a point 403 of its focal plane situated at the center of a small circular plane mirror 404. The image of the liquid crystal layer 5 supplied by collimator 41 and mirror 404 is formed in a plane 44, in which either a screen or the photosensitive surface of a viewing camera associated with a television receiver 440 is disposed.

The writing-in beam spatially modulates the optical scattering coefficient of the liquid crystal layer, thus transcribing therein the X-rays image in the form of more or less light scattering long lasting zones. The light-rays coming back from the scattering zones pass through collimator 41 with an incidence angle different from that of the rays simply reflected by mirror 35 in the absence of non scattering zones, and thus fall outside the mirror 404. The different regions of the image formed in the plane 44 consequently appear all the more bright as they correspond to more absorbent regions of the object 111 being examined. Advantage may be taken of the threshold effect of the liquid crystal to increase the contrast of the image. Since reflective layer 35 protects the photoconductive plate from the read-out radiation emanating from source 40, the wavelength of the light emitted by this latter may be chose independently of the photoconductivity threshold of the material constituting plate 3.

The image formed in plane 44 may be observed while the X-ray source 110 is irradiating the object 111. The arrangement of the optical read-out system enables the screen situated in plane 44 to be disposed outside the X-beam, so that the risk of irradiating the observer may be eliminated. If such a method of examination is the rule, a liquid crystal layer consisting of a nematic material may replace the storage nematic-cholesteric mixture.

It is also possible to take advantage of the storage effect of the crystal to carry out an examination in two periods. During a first period, X-ray source 110 irradiates object 111 whereof the image is recorded in the liquid crystal layer having storage properties. In a second period, source 40 is placed in service, and projects this recorded image into plane 44. Once it has been examined, the image is erased by subjecting the cell to an erasure alternating electrical voltage at a frequency of a few tens of kHz and at a voltage sufficiently high to restore the liquid crystal molecules to their initial state.

The present invention has been described in the case in which the photoconductive strip consists of bismuth oxide, or an oxide of bismuth and silicon or germanium. It must be understood that the invention extends to any device using a cell of the same structure in which the photoconductive plate is made of a different photoconductive material having however similar properties, namely a very low dark current and an absorption coefficient vis-a-vis the writing-in radiation having a value comprised between 0.5 and 100 cm$^{-1}$. Thus, one can obtains a photoconductive plate sufficiently thick to constitute one of the two walls enclosing the liquid crystal, having good insulating properties in the regions non-illuminated by the writing-in beam and a photoconductivity which remains appreciable over the whole depth of the plate in the illuminated regions.

What we claim is:

1. An image converter device for receiving an image projected by a write-in radiation and reading said image by a read-out radiation of visible light, comprising:
    a liquid crystal layer wherein said image is at least temporarily inscribed for being read by said read-out radiation, said layer at least including a mesomorphic material having a nematic phase and being in an initial uniform orientation in the absence of said write-in radiation;
    a first and second self supporting slab enclosing and completely supporting said layer; said first slab being 0.5 to 1 mm in thickness consisting of material which is photoconductive under the action of said write-in beam and being arranged for receiving said projected image; said second slab being transparent to said read-out radiation;
    a first and a second electrode respectively arranged on the external face of said photoconductive first slab and the internal face of said transparent second slab and respectively transparent to said write-in and said read-out radiation;
    voltage generating means for at least applying a control voltage between said first and second electrodes.

2. A device as claimed in claim 1, wherein said photoconductive slab is made of a material containing bismuth oxide.

3. A device as claimed in claim 2, wherein said bismuth oxide containing material further contains silicon oxide.

4. A device as claimed in claim 2, wherein said bismuth oxide containing material further contains germanium oxide.

5. A device as claimed in claim 2, wherein said bismuth oxide containing material is monocrystalline.

6. A device as claimed in claim 2, wherein said bismuth oxide containing material is a sintered polycrystalline material.

7. A device as claimed in claim 1, wherein said voltage generating means, comprising means for control voltage causing a voltage greater than the threshold voltage of the dynamic scattering effect to be applied to at least part of the points of the liquid crystal layer in the presence of said write-in radiation.

8. A device as claimed in claim 1, wherein said read-out radiation is polarized radiation, said device further comprising a polarized light analyzer arranged opposite to the external face of said transparent slab, said liquid crystal layer being in nematic phase, said control voltage comprising means for causing a voltage greater than the threshold voltage above which said initial orientation is modified to be applied to at least part of the points of the liquid crystal layer in the presence of said write-in radiation.

9. A device as claimed in claim 1, wherein said first slab has a light absorption coefficient at most equal to 100 $cm^{-1}$ and at least equal to 0.5 $cm^{-1}$.

10. A device as claimed in claim 8, wherein said liquid crystal layer, when in initial uniform orientation, has a twisted structure, said read-out radiation being a linearly polarized radiation and said analyzer comprising a linear analyzer.

11. A device as claimed in claim 1, wherein said read-out radiation passes through said photoconductive slab before reaching said liquid crystal layer.

12. A device as claimed in claim 11, wherein the spectral region to which the photoconductive material is sensitive is different form the spectral region of the read-out radiation.

13. A device as claimed in claim 11, wherein the spectral region to which the photoconductive material is sensitive has a part in common with the spectral region of the read-out radiation, said control voltage comprising means for causing an uniform voltage greater than a threshold voltage to be applied to the whole liquid crystal layer illuminated by said read-out radiation in the absence of said write-in radiation.

14. A device as claimed in claim 1, further comprising a layer reflecting said read-out radiation and arranged between said photoconductive slab and said liquid crystal layer.

15. A device as claimed in claim 1, further comprising an X-rays source for emitting said write-in radiation.

16. A device as claimed in claim 1, wherein said write-in radiation is the radiation emanating from the moving spot of a cathodic tube screen, and said device further comprising optical projecting means for projecting the image of said spot onto said photoconductive slab.

17. A device as claimed in claim 1, which further comprises a light source for emitting said read-out radiation, optical collimating means for receiving said read-out radiation and illuminating said liquid crystal layer with parallel beam and image formation optical means for projecting the image inscribed in said liquid crystal layer onto a receiving surface.

18. A device as claimed in claim 17 wherein said receiving surface is a photosensitive surface.

19. A device as claimed in claim 7, wherein said layer includes a mesomorphic material having a cholesteric phase.

20. A device as claimed in claim 1 or 9, wherein said first slab has a thickness at most equal to 0.8 mm and at least equal to 0.1 mm.

21. An image converter device for receiving an image projected by a write-in radiation and reading said image by a read-out radiation of visible light, comprising:
a liquid crystal layer wherein said image is at least temporarily inscribed for being read by said read-out radiation, said layer at least including a mesomorphic material having a nematic phase and being in an initial uniform orientation in the absence of said write-in radiation;
a first and second self-supporting slab enclosing and completely supporting said layer; said first slab being 0.5 to 1 mm in thickness consisting of material which is photoconductive under the action of said write-in beam and being arranged for receiving said projected image; said photoconductive material containing bismuth oxide; said second slab being transparent to said read-out radiation;
a first and a second electrode respectively arranged on the external face of said photoconductive first slab and the internal face of said transparent second slab and respectively transparent to said write-in and said read-out radiation; and
voltage generating means for at least applying a control voltage between said first and second electrodes.

22. A device as claimed in claim 21, wherein said bismuth oxide containing material is a sintered polycrystalline material.

23. A device as claimed in claim 21, wherein said bismuth oxide containing material further contains silicon oxide.

24. A device as claimed in claim 21, wherein said bismuth oxide containing material further contains germanium oxide.

25. A device as claimed in claim 21, wherein said bismuth oxide containing material is monocrystalline.

* * * * *